July 21, 1964 L. R. BEHAN 3,141,351
STEERING, THROTTLE AND GEAR SHIFT CONTROL
Filed Aug. 16, 1962 3 Sheets-Sheet 1

INVENTOR.
LOUIS BEHAN
BY
ATTORNEY

INVENTOR.
LOUIS BEHAN

July 21, 1964   L. R. BEHAN   3,141,351
STEERING, THROTTLE AND GEAR SHIFT CONTROL
Filed Aug. 16, 1962   3 Sheets-Sheet 3

INVENTOR.
LOUIS BEHAN
BY
ATTORNEY

United States Patent Office 3,141,351
Patented July 21, 1964

3,141,351
STEERING, THROTTLE AND GEAR SHIFT CONTROL
Louis R. Behan, 2133 W. 10th St., Brooklyn, N.Y.
Filed Aug. 16, 1962, Ser. No. 217,495
2 Claims. (Cl. 74—484)

This invention relates to a combination steering mechanism and remote throttle and gear shift control for boats.

Heretofore separate steering wheels, throttle and gear shift controls have been provided on outboard and inboard motorboats. These separate controls were difficult to manipulate simultaneously so that the helmsman could not keep both hands on the steering wheel while manually shifting gears between forward and reverse and also manually controlling the throttle to vary or hold speed of the boat.

The present invention is directed at providing in a unitary assembly a steering wheel and a throttle and gear shift control wheel all rotatably mounted on a common axis. The steering wheel is connected by cables to a remote rudder or tiller. The throttle and gear shift control wheel is connected mechanically to a cable feeding and reversing mechanism from which cables extend to the motor. The throttle and gear shift control wheel has multiple spoke handles extending radially outward of the steering wheel. One or more of these spoke handles can be grasped by the helmsman at all positions of the steering wheel without losing his grip on the steering wheel, so that the helmsman can manipulate the throttle and gear shift control while he is steering the boat.

It is therefore a principal object of the invention to provide a unitary assembly of a steering wheel and a throttle and gear shift control wheel in a motorboat.

It is a further object to provide a coaxial assembly of a steering wheel and a throttle and gear shift control wheel in a motor boat.

Another object is to provide an assembly as described with a housing for supporting the same upon a bulkhead or dashboard at the helmsman's position in a boat.

Another object is to provide an assembly of control wheels as described which can be readily assembled and disassembled; which is rugged in construction; which is attractive in appearance; and which facilitates handling and controlling a motor boat.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 3:
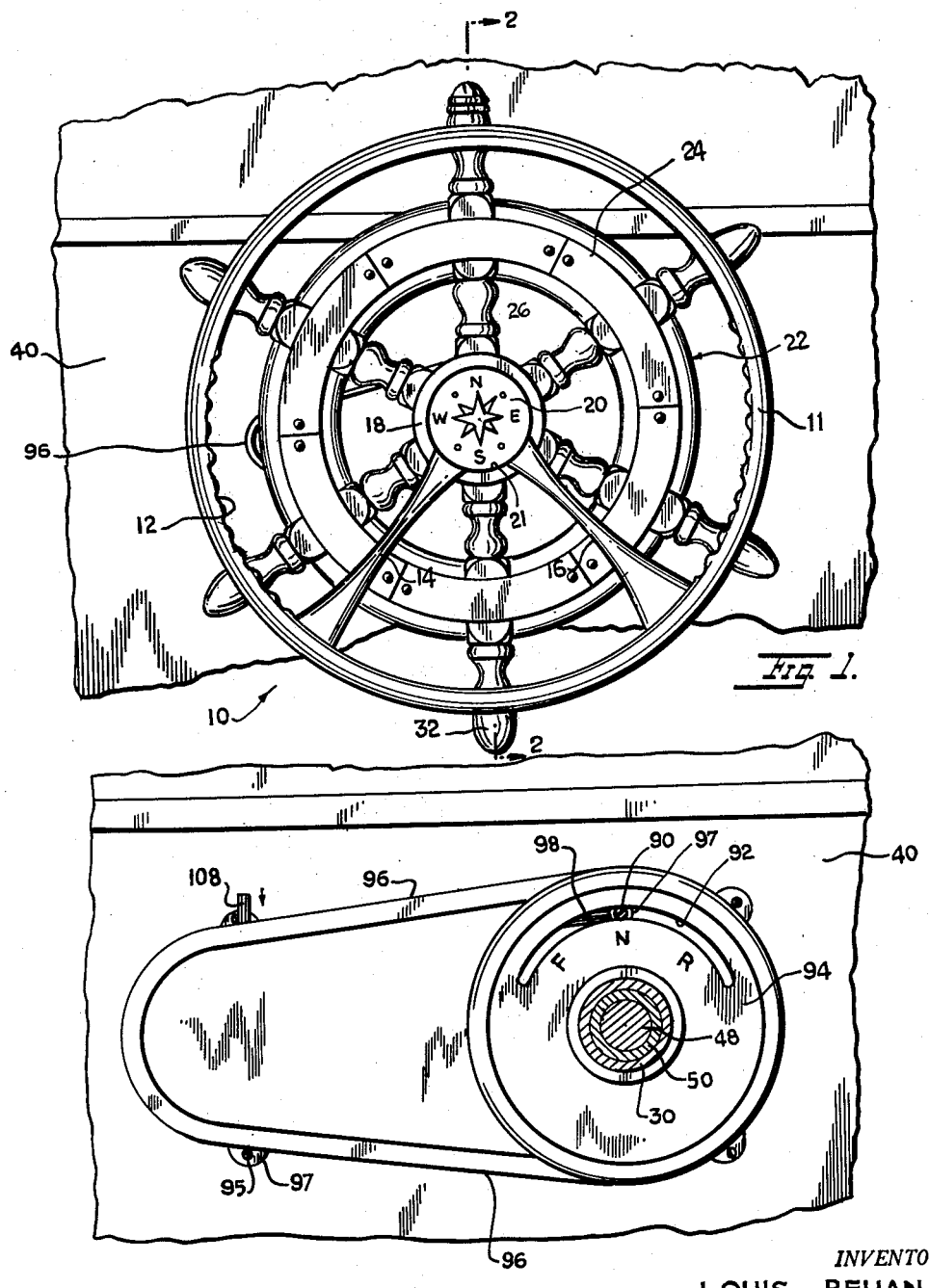
FIG. 1 is a front elevational view of an assembly embodying the invention, shown mounted on a bulkhead or dashboard, parts of which are broken away.
FIG. 3 and FIG. 4 are sectional views taken on lines 3—3 and 4—4, respectively, of FIG. 2.
Figure 2:
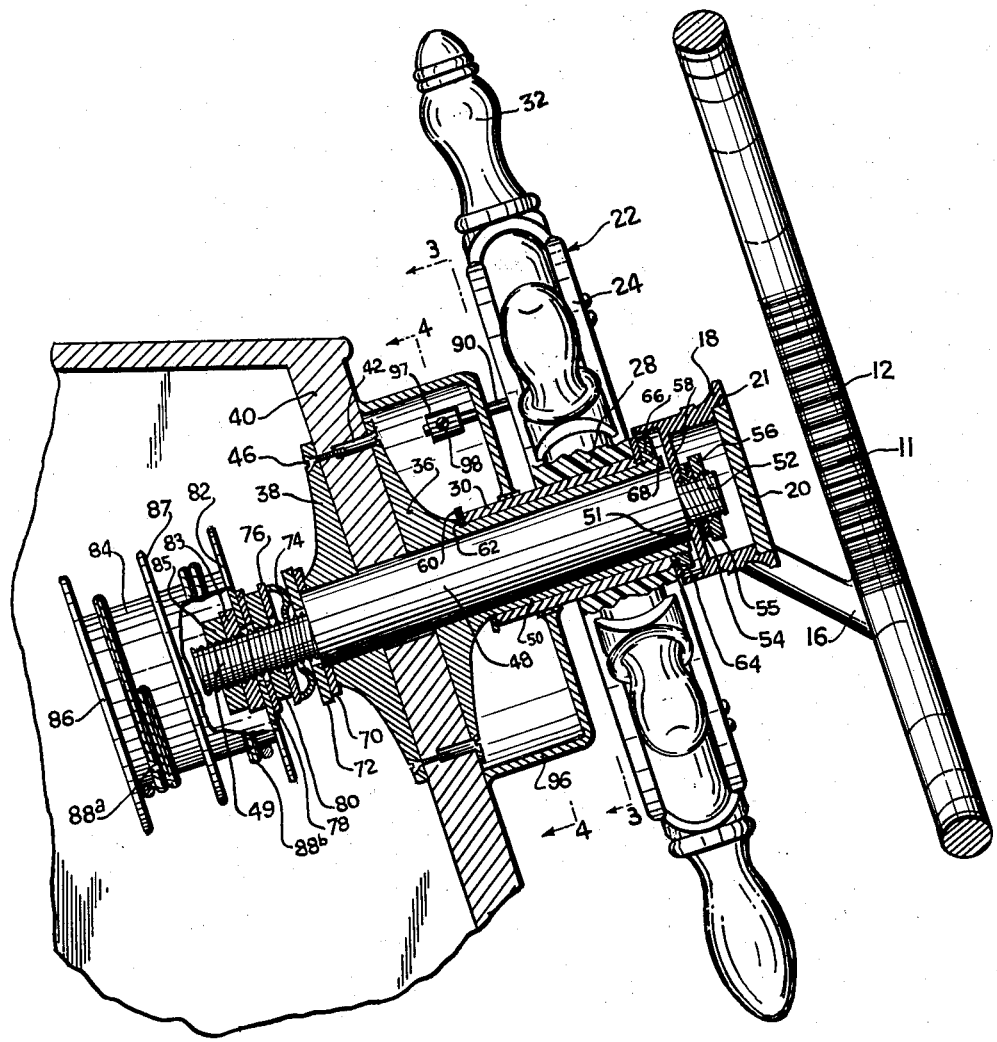
FIG. 2 is a vertical sectional view taken on line 2—2 of FIG. 1.
Figure 4:
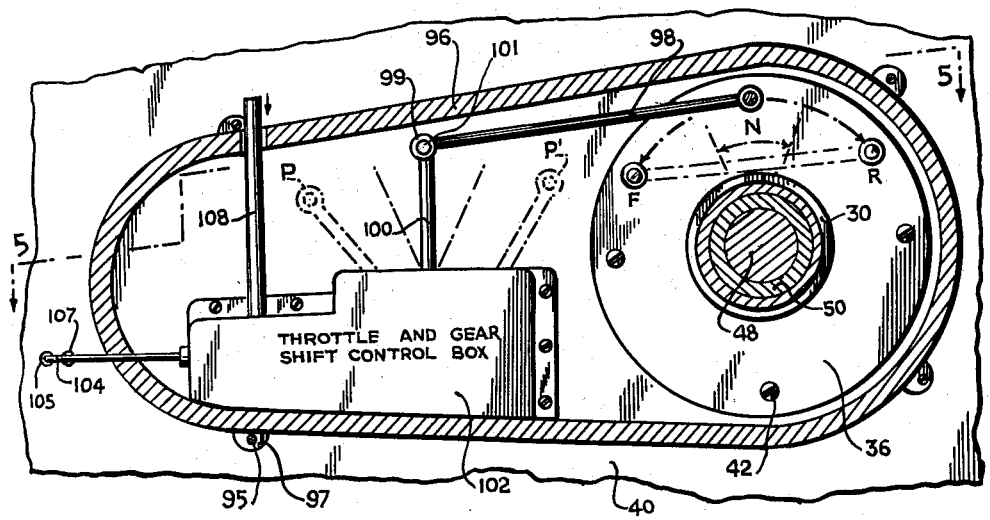
Figure 5:
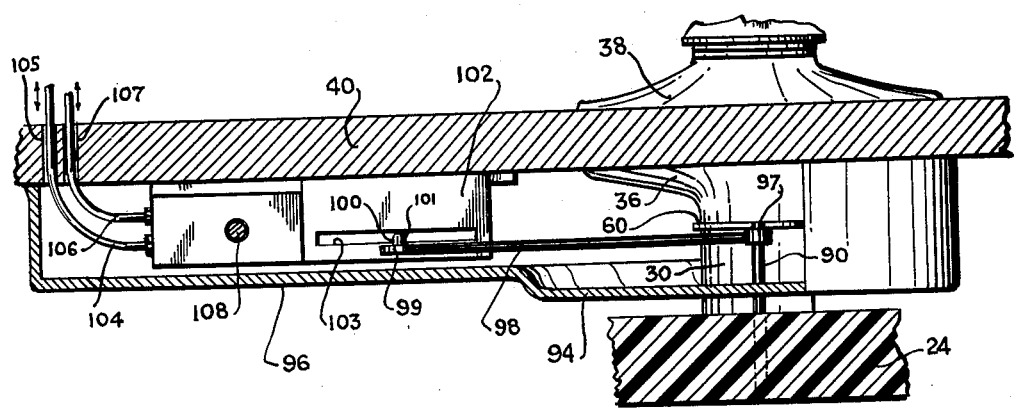
FIG. 5 is a sectional view taken on line 5—5 of FIG. 4.

Referring to the drawings, FIG. 1 shows the assembly 10 including a circular steering wheel 11 provided with internal corrugations 12 to serve as finger or hand grips. The wheel has two radial spokes 14, 16 attached to a central hub 18. The hub is closed by a circular escutcheon plate 20. Coaxial with and behind the steering wheel is a throttle and gear shift control wheel 22. The wheel 22 includes a flat circular ring 24 which is connected by a plurality of radial spokes 26 to a central sleeve 28 secured permanently to an internal metal or plastic sleeve bushing 30; see FIG. 2. On the periphery of the ring 24 in radial alignment with spokes 26 are spoke handles 32.

The entire wheel 22 can be made from plastic material by compression molding or other known molding methods. This will result in a rigid durable wheel structure of very attractive appearance at low cost.

The assembly includes a pair of circular flanges or disks 36, 38 having flat sides abutting front and rear sides, respectively, of the bulkhead 40 of the boat. The flanges are secured to the bulkhead by sleeve screws 42 at flange 36 inserted in bores 44 in the bulkhead and secured by screws 46 at flange 38. A cylindrical shaft 48 passes axially through the axially aligned flanges. Flange 36 has a cylindrical neck extension 50 and is preferably made of bronze or other suitable bearing metal or plastic. Shaft 48 is freely rotatable in neck extension 50. Shaft 48 has a threaded stud 52 on its outer end on which are washers 54, 55 and a nut 56 locking a transverse plate 58 of hub 18 to shoulder 51 at the smooth end of the shaft. Plate 20 is seated in a recess 21 at the end of the hub.

The cylindrical bushing 30 surrounds the neck extension 50 and is rotatable thereon. A washer 60 is located between the inner end of bushing 30 and shoulder 62 at the base of neck extension 50.

Another washer 64 is located at the outer end of bushing 30 and a nut 66 is screwed upon an externally threaded portion 68 of the stationary sleeve extension 50. This arrangement permits the wheel 22 to turn independently of wheel 11.

At the inner end of shaft 48 is a threaded stud 49 integral with the shaft. On this stud are two washers 70, 72 and a spring washer 74 which hold shaft 48 and wheel 11 in any position of rotation thereof. The washer 74 also resiliently limits axial movement of the shaft outwardly of the aligned flanges 36, 38 while the transverse plate 58 limits inward axial movement of the shaft since it is stopped by the outer free end of neck extension 50. Two flat washers 76, 78 with a locknut 80 therebetween are mounted on stud 49. The stud passes through a central opening in end plate 82 of a drum 84. A pair of nuts 83, 85 are screwed on the free end of stud 49 and bear on the inner side of plate 82 securing the drum to the shaft.

The drum 84 has an end flange or ring 86 and a central flange or ring 87. Both rings extend radially outward and define with end plate 82 two drum sections. Ends of cables 88$^a$, 88$^b$ are engaged upon the drum and terminate at the rudder or tiller of the boat (not shown) for controlling the same.

A pin 90 extends in the axial direction of the shaft 48 toward the bulkhead from the inner side of wheel ring 24. This pin passes through an arcuate slot 92 in the front face plate 94 of a housing or casing 96; see FIGS. 2–5. The housing 96 is secured by screws 95 inserted through eyelets 97 of the housing and engaged in the bulkhead 40. On the inner end of the pin is rotatably engaged a collar 97 to which is connected a link 98. The link terminates at another collar 99 rotatably engaged with a bent finger 101 at the end of a control rod 100.

Control rod 100 extends upwardly through slot 103 in a throttle and gear control box 102. This box is of conventional design and forms no part of the present invention. It has a pair of cables 104, 106 passing through holes 105 and 107 entering at bulkhead 40 and terminating in box 102. The cables are operatively connected to control rod 100. When the control rod 100 is in its upright position shown in FIG. 4, the motor is in neutral condition and the motor idles. When rod 100 is moved clockwise beyond angle A a first one of the cables 104, 106 which terminate at the gear shift mechanism and throttle of the motor (not shown) is retracted and the mechanism is shifted from neutral to reverse drive position. Further clockwise movement of rod 100 retracts the second cable and the throttle of the motor is actuated. When rod 100 is moved counterclockwise beyond angle A' the first one of the cables is advanced and the shift mechanism of the motor is shifted to forward drive position. Further counterclockwise movement of rod 100 beyond angle A' retracts the second cable and actuates the throttle.

A shaft 108 is provided on box 102 for disabling the first cable so that the rod 100 can be moved angularly to either side for actuating the throttle while the motor remains in neutral. This shaft extends outwardly through the top of box 102 for manual operation.

Since rod 100 is connected directly to pin 90 which is turned angularly by wheel 22, turning of wheel 22 by the helmsman operates the throttle and gear shift mechanism of the motor. At the same time the helmsman can turn the steering wheel. He will grip one or another of the spoke handles 32 while turning or holding the wheel 11 and manipulate the wheel 22 to vary the throttle setting or to shift to neutral, forward or reverse as may be desired.

The invention makes possible more positive control of a motorboat under all driving conditions. The helmsman has continuous full command of the boat and of the operating controls. The assembly can be mounted in various positions in different types of boats and can use different known types of throttle and gear shift control boxes. The assembly is externally aesthetically attractive and enhances the appearance of the boat in which it is installed.

It is to be understood that the pin 90 may also extend radially from the sleeve bushing 30 to engage the link 98.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An assembly for steering a boat and for controlling a throttle and gear shift mechanism of a motor driving the boat, comprising in combination; a bulkhead having an opening therein, a pair of substantially flat flanges having openings therein, means mounting said flanges on opposite sides of said bulkhead within the openings in the flanges in axial alignment with the opening in the bulkhead, a first wheel, a shaft, means securing said shaft to the wheel and axially thereof, one of said flanges having a cylindrical neck extension, said shaft passing axially and rotatably through said neck extension and terminating beyond the other flange, a drum secured on the end of the shaft, first cables engaged on said drum for operating boat steering means, a second wheel, a sleeve secured axially to the second wheel, said sleeve being disposed rotatably on and coaxial with said neck extension, a pair of second cables for operating said throttle and gear shift mechanism of the motor, a control handle, said second cables being operatively connected to said control handle for actuation thereby, a housing covering said one flange and having a front wall with an opening therein, said neck extension, sleeve and shaft passing through the opening in said wall, said wall having an arcuate slot, a pin extending outwardly of the second wheel in the axial direction thereof and passing through said slot, and linkage means operatively connecting said pin and said control handle, whereby turning of the second wheel independently of the first wheel moves the control handle to actuate the second cables for operating said throttle and gear shift mechanism, and turning of the first wheel independently of the second wheel actuates the first cables to operate said steering control means, said second wheel having radially extended spoke handles extending outwardly beyond said first wheel for manual grasping by a helmsman while holding on to the first wheel, whereby both wheels can be rotated simultaneously for moving the first and second cables simultaneously to steer the boat in a certain direction while operating the throttle and gear shift mechanism to control speed of the boat in said direction.

2. An assembly for steering a boat and for controlling a throttle and gear shift mechanism of a motor driving the boat, comprising in combination; a bulkhead having an opening therein, a pair of substantially flat flanges having openings therein, means mounting said flanges on opposite sides of said bulkhead within the openings in the flanges in axial alignment with the opening in the bulkhead, a first wheel, a shaft, means securing said shaft to the wheel and axially thereof, one of said flanges having a cylindrical neck extension, said shaft passing axially and rotatably through said neck extension and terminating beyond the other flange, a drum secured on the end of the shaft, first cables engaged on said drum for operating boat steering means, a second wheel, a sleeve secured axially to the second wheel, said sleeve being disposed rotatably on and coaxial with said neck extension, a pair of second cables for operating said throttle and gear shift mechanism of the motor, a control handle, said second cables being operatively connected to said control handle for actuation thereby, a housing covering said one flange and having a front wall with an opening therein, said neck extension, sleeve and shaft passing through the opening in said wall, said wall having an arcuate slot, a pin extending outwardly of the second wheel in the axial direction thereof and passing through said slot, and linkage means operatively connecting said pin and said control handle, whereby turning of the second wheel independently of the first wheel moves the control handle to actuate the second cables for operating said throttle and gear shift mechanism, and turning of the first wheel independently of the second wheel actuates the first cables to operate said steering control means, said second wheel having radially extending spoke handles extending outwardly beyond said first wheel for manual grasping by a helmsman while holding on to the first wheel, whereby both wheels can be rotated simultaneously for moving the first and second cables simultaneously to steer the boat in a certain direction while operating the throttle and gear shift mechanism to control speed of the boat in said direction, and spring means on said shaft disposed between said drum and other flange for limiting axial movements of said shaft and for holding the first wheel in any position of rotation thereof.

References Cited in the file of this patent
UNITED STATES PATENTS

| | | |
|---|---|---|
| 890,565 | King | June 9, 1908 |
| 1,891,208 | Schuetz | Dec. 13, 1932 |